United States Patent [19]

Kastin

[11] Patent Number: 4,597,981

[45] Date of Patent: * Jul. 1, 1986

[54] SOFT CANDY COMPOSITION

[76] Inventor: Howard Kastin, 1262 Park St., Atlantic Beach, N.Y. 11509

[*] Notice: The portion of the term of this patent subsequent to Jul. 9, 2002 has been disclaimed.

[21] Appl. No.: 742,540

[22] Filed: Jun. 7, 1985

Related U.S. Application Data

[63] Continuation-in-part of Ser. No. 563,678, Dec. 20, 1983, Pat. No. 4,528,206.

[51] Int. Cl.⁴ .............................................. A23G 3/00
[52] U.S. Cl. .................................. 426/660; 426/658; 426/804; 426/576
[58] Field of Search ............... 426/660, 658, 573, 572, 426/804, 576

[56] References Cited

U.S. PATENT DOCUMENTS

| | | | |
|---|---|---|---|
| Re. 26,959 | 9/1970 | Conrad et al. | 426/658 |
| 3,582,359 | 6/1971 | Horn | 426/660 |
| 3,653,922 | 4/1972 | Schmitt et al. | 426/548 |
| 3,766,165 | 10/1973 | Rennhard | 426/804 |
| 3,876,794 | 4/1975 | Rennhard | 426/658 |
| 4,097,616 | 6/1978 | Guillou | 426/660 |
| 4,154,867 | 5/1979 | Aldrich et al. | 426/660 |
| 4,247,568 | 1/1981 | Carrington et al. | 426/661 |
| 4,248,895 | 2/1981 | Stroz et al. | 426/660 |
| 4,271,197 | 6/1981 | Hopkins et al. | 426/3 |
| 4,279,931 | 7/1981 | Verwaerde et al. | 426/48 |
| 4,311,722 | 1/1982 | Vink et al. | 426/660 |
| 4,323,588 | 4/1982 | Vink et al. | 426/660 |

OTHER PUBLICATIONS

Acta. Ondotogica Scand., vol. 32, No. 4, (1974), G. Rostell et al., "Substitution of Sucrose by Lycasin ® in Candy", pp. 235-253.

Proc. ERGOB Conf., Geneva (1978), P. Leroy, "Hydrogenated Starch Hydrolysates", pp. 114-119.

*Primary Examiner*—Jeanette M. Hunter
*Attorney, Agent, or Firm*—Hedman, Gibson, Costigan & Hoare

[57] ABSTRACT

A soft candy composition comprising 9-82% by weight of a hydrogenated starch hydrolysate, 82-9% by weight of at least one polymer of glucose or maltose, 3-16% by weight of gelatin and a sufficient quantity of water to form a soft candy composition.

18 Claims, No Drawings

SOFT CANDY COMPOSITION

This application is a continuation-in-part application of U.S. Ser. No. 563,678 filed Dec. 20, 1983, now U.S. Pat. No. 4,528,206 and which discloses and claims a hard candy composition.

FIELD OF THE INVENTION

The present invention relates to a hard candy composition which contains as principal ingredients 10–90% by weight of a hydrogenated starch hydrolysate and 90–10% by weight of at least one polymer of glucose or maltose. The present invention also relates to a soft candy composition containing 9–82% by weight of said hydrogenated starch hydrolysate, 82–9% by weight of said at least one polymer, 3–16% by weight of gelatin and a sufficient amount of water to make a soft candy. The present candy composition is sugarless, and in a preferred form of the invention is low-calorie and non-cariogenic.

BACKGROUND OF THE INVENTION

Because many people consume large amounts of sweet, high-calorie candies, there is an increasing need to produce a candy composition which is sweet tasting but contains no sugar. There is also a need for candies which are low in calories. Since typical candy compositions lead to the formation of cavities, there is also a need to produce a candy composition which is non-cariogenic.

There have recently been developed several sugar substitutes which can be used in a candy composition. Of particular note are hydrogenated starch hydrolysates which can be used as a substitute for sucrose in candy and other sugar-containing foods. Typical examples of such hydrogenated starch hydrolysates are disclosed in U.S. Pat. No. 4,279,931 and U.S. Pat. No. 4,271,197 and references cited therein.

Hydrogenated starch hydrolysates have two major drawbacks which inhibit their use in the making of sugarless, low-calorie candy compositions, especially a hard candy composition.

More specifically, hydrogenated starch hydrolysates typically have a caloric content of approximately 4 calories per gram. The amount of calories per gram far exceeds the maximum calories defined by the Food and Drug Administration as a "reduced calorie" food, which is at least $\frac{1}{3}$ less calories. A reduced calorie product containing hydrogenated starch hydrolysates would therefore have no more than 2.67 calories/gram.

The second drawback associated with hydrogenated starch hydrolysates is that they are relatively unstable under high temperature (e.g., 80° F. or higher) and high humidity conditions. In other words, candies containing hydrogenated starch hydrolysates have a tendency to cold flow when subjected to these conditions.

To overcome this problem, candies containing hydrogenated starch hydrolysates must be packaged under carefully controlled conditions. For example, candies containing hydrogenated starch hydrolysates must be wrapped so as to keep the moisture content in the candies to less than a maximum of about 1% by weight, preferably less than 0.5% by weight. This requires that the candy composition units be packaged immediately after cooking while still warm, preferably in an air-conditioned environment. The candy must also be packaged in a moisture-proof container. All of these procedures add to the time and cost of preparing the candy composition.

Applicant has discovered that the combination of a polymer of glucose or maltose in a specified amount and a hydrogenated starch hydrolysate as the principal ingredients results in a candy composition which is stable under conditions of high temperature and high humidity. The present hard candy composition eliminates the packaging and storage problems associated with known compositions.

U.S. Pat. No. 4,247,568 discloses a process for preparing non-digestible food additives which comprises heating a mixture of a starch hydrolysate with an edible acid having a moisture content of less than 5% by weight. The resulting product may be combined with a number of additives including a modified polydextrose.

These references do not teach or suggest the combination of a hydrogenated starch hydrolysate and a polymer of a glucose or maltose (e.g., polydextrose) in the specified amounts according to the present invention. There is no suggestion in these references of how to overcome the problem of cold flow of hard candy when exposed to high temperature and high humidity containing hydrogenated starch hydrolysates nor of applicant's discovery that the use of polymers of glucose and maltose overcomes the problem.

Furthermore, these references do not teach or suggest how to make a soft candy composition from the same combination of ingredients.

It is therefore an object of the present invention to provide a hard candy composition which is sugar-free and low in calories and which eliminates many of the time-consuming, high-cost packaging procedures associated with previous candy compositions containing hydrogenated starch hydrolysates.

It is a further object of the present invention to provide a hard candy composition which is also non-cariogenic.

It is a still further object of the present invention to provide a soft candy composition which is sugar-free and low in calories and preferably, non-cariogenic.

SUMMARY OF THE INVENTION

The present invention is directed to a hard candy composition which contains as principal ingredients, 10–90% by weight of a hydrogenated starch hydrolysate and 90–10% by weight of at least one polymer of glucose or maltose. In a preferred form of the invention, both the hydrogenated starch hydrolysate and the polymer of glucose or maltose are present in amounts of between 45 and 55% by weight.

The present invention is also directed to a soft candy composition which contains as principal ingredients 9–82% by weight of said hydrogenated starch hydrolysate, 82–9% by weight of said at least one polymer, 3–16% by weight of gelatin and a sufficient quantity of water, preferably 6–20% by weight, to form a soft candy, In a preferred form of the soft candy composition the hydrogenated starch hydrolysate is present in an amount of 35–45% by weight and at least one polymer of glucose or maltose is present in an amount of 40–30% by weight.

DETAILED DESCRIPTION OF THE INVENTION

The preferred hydrogenated starch hydrolysates which may be used in the present invention for both the hard candy and soft candy compositions are disclosed in U.S. Pat. No. 4,279,931, and *Acta Odontotogica Scand.* Vol. 32 #4, pp. 230-253 (1974). Hydrogenated starch hydrolysates are obtained by the partial hydrolysis of starch (e.g., potato starch) to obtain the hydrolysate which is then hydrogenated, typically under high temperature and high pressure conditions. Methods of making hydrogenated starch hydrolysates are disclosed in U.S. Pat. No. 4,279,931 incorporated herein by reference.

The hydrogenated starch hydrolysate typically contains a mixture of several components. For example, such products are usually composed of a minor amount of free D-Sorbitol as well as hydrogenated disaccharides, oligosaccharides containing between 2 and 6 glucose units and polysaccharides which contain more than 6 glucose units. The preferred hydrogenated starch hydrolysates contain 4-14% of sorbitol, 45-60% by weight of hydrogenated disaccharides, no more than 3% by weight of hydrogenated polysaccharides having a degree of polymerization of at least 20 and the balance constituting a mixture of hydrogenated polysaccharides having a degree of polymerization of 3 to 20.

In accordance with the present invention, the most preferred hydrogenated starch hydrolysate comprises 6-8% by weight of D-Sorbitol, 50-55% by weight of hydrogenated disaccharides, 20-25% by weight of hydrogenated tri to hexasaccharides and from 15-20% by weight of hydrogenated polysaccharides having a degree of polymerization greater than hexasaccharides. A product having this composition is manufactured by Roquette Freres under the trademark LYCASIN. Lycasin is particularly suited because it is non-cariogenic (see *Acta. Ondototogica Scand.* Vol. 32 #4, pp. 230-235 (1974)).

The present hard candy composition also includes from 90-10% by weight of a polymer made up of glucose or maltose monomer units and the soft candy composition contains the same ingredient in an amount of 82-9% by weight. Such compounds have no sweetness and have a caloric content of about 1 calorie per gram. Applicant has determined that such polymers, when used in the present hard candy composition, stabilize the hydrogenated starch hydrolysate so that cold flow does not occur under high temperature and high humidity conditions. Because such polymers have a caloric content of only 1 calorie per gram, they have the additional advantage of lowering the overall caloric content of the hard and soft candy compositions. In a preferred form of the hard candy composition, the amount of each of the hydrogenated starch hydrolysate and the polymer is 45-55% by weight, and the caloric content of the present hard candy composition meets the requirements of a reduced calorie food. The same result is obtained when the soft candy composition contains 35-45% by weight of the hydrogenated starch hydrolysate and 40-30% by weight of said polymer.

Suitable polymers of glucose or maltose as used in the present invention for both the hard and soft candy compositions are disclosed in U.S. Pat. Nos. 3,766,165 and 3,876,794 incorporated herein by reference. Suitable methods of preparing such polymers are also disclosed in these references.

These polymers include polymers which are water-soluble, randomly bonded condensation polymers of dextrose, and are commonly used as bulking agents as, for example, Polydextrose manufactured by Pfeizer, Inc.

The soft candy composition also contains from 3-16% by weight of gelatin of the type typically used in food compositions. Gelatin is a glutinous material obtained from animal or vegetable tissues by boiling. Gelatin and its method of manufacture are known to those skilled in the art.

Water is also present in the soft candy composition in an amount sufficient to render the candy soft to the touch. The amount of water may vary depending on the degree of softness desired and the energy needed to reduce the amount of water to the desired level. Those skilled in the art are aware of how to determine the desired level of water needed to produce a soft candy.

The following is a procedure showing how to make a hard candy composition and is submitted for illustrative purposes only.

A fruit flavor (cherry) hard candy composition was prepared using the following ingredients:

| | |
|---|---|
| Lycasin ® | 73.55 pounds (wet basis: containing about 25% water) |
| Polydextrose | 45 pounds (dry weight) |
| Citric acid | (4 ounces) |
| Cherry flavor | (2 ounces) |
| Red color cube | (1 ounce) |

Lycasin ® is a product manufactured by Roquette Freres, Inc. and Polydextrose is a product manufactured by Pfeizer, Inc. The red coloring cube used in this example is manufactured by H. Hohnstamm, Inc. The Lycasin ® and Polydextrose were placed in a cooking vessel and heated to 310° F. at a vacuum of 29 in. The resulting product was removed from the cooker and allowed to cool to 250° F. The citric acid, flavoring and coloring, were added to the cooled product. The resulting product was then placed on a cold slab and mixed to thereby evenly distribute the citric acid, coloring and flavoring, followed by further cooling of the mixed product. The resulting cooled product was then fed through a lollypop hard candy forming machine manufactured by Latini Diepop, Chicago, Ill.

The resulting lollypops containing the composition of the present invention were stored at 100° F. at a relative humidity of 80% without packaging for 30 days. The lollypops remained hard and there was no evidence of cold flow.

The following example is directed to an embodiment of a soft candy composition in accordance with the present invention and is submitted for illustrative purposes only. The example is not to be construed as limiting the scope of the invention set forth in the claims forming a part of the present application.

EXAMPLE

An orange fruit flavor soft candy composition was prepared in the following manner: 14.3 grams of Gelatin (200 Bloom) were added very slowly to 56.0 grams of warm water under vigorous agitation. The resulting solution was allowed to set for about 15 minutes during which time the gelatin rehydrated and formed a stiff gel.

78.1 Grams of LYCASIN ® (wet basis: containing about 25% water), a hydrogenated starch hydrolysate manufactured by Roquette Freres, Inc., was combined with 56.1 grams of water in a metal beaker. The resulting mixture was heated to boiling.

51.5 Grams of Polydextrose, a product manufactured by Pfeizer, Inc., was slowly added to the boiling mixture under stirring until the Polydextrose dissolved. The mixture was then heated to about 127° C. and then heating was stopped.

The rehydrated gelatin previously prepared was added to the heated mixture and stirred until the gelatin completely dissolved. The resulting gelatin mixture was then cooled to below 100° C.

Citric acid (0.2-0.4% by weight in a 50% water solution), about 0.1% by weight flavoring (orange) and about 0.1% by weight orange color (orange coloring tube manufactured by H. Hohnstamm, Inc.) were added to the cooling mixture.

The cooling mixture was then poured into cavities made from cornstarch. The cavities were prepared by placing several cups of cornstarch in a shallow tray to form a smooth layer of about ½ to ¾ inch thick. Teaspoon sized depressions were made in the cornstarch to form the cavities.

The cooling mixture was poured into the cavities and sprinkled lightly with powdered mannitol. The mixture was allowed to harden overnight and removed in the form of a soft orange flavored candy.

What is claimed is:

1. A soft candy composition consisting essentially of:
   (a) 9-82% by weight of a hydrogenated starch hydrolysate;
   (b) 82-9% by weight of at least one polymer of glucose or maltose;
   (c) 3-16% by weight of gelatin; and
   (d) a sufficient quantity of water to form said soft candy composition.

2. The soft candy composition of claim 1 wherein the quanitity of water is 6-20% by weight.

3. The soft candy composition of claim 1 wherein said hydrogenated starch hydrolysate is present in an amount of between 35 and 45% by weight and said at least one polymer is present in an amount of between 40 and 30% by weight.

4. The soft candy composition of claim 2 wherein said hydrogenated starch hydrolysate is present in an amount of between 35 and 45% by weight and said at least one polymer is present in an amount of between 40 and 30% by weight.

5. The soft candy composition of claim 1 wherein said hydrogenated starch hydrolysate consists essentially of 4 to 14% of Sorbitol, 45-60% by weight of hydrogenated disaccharides, no more than 3% by weight of hydrogenated polysaccharides having a degree of polymerization of at least 20 and the balance constituting a mixture of hydrogenated polysaccharides having a degree of polymerization of 3 to 20.

6. The soft candy composition of claim 5 wherein said hydrogenated starch hydrolysate consists essentially of 6-8% by weight of D-Sorbitol, 50-55% by weight of hydrogenated disaccharides, 20-25% by weight of hydrogenated tri to hexasaccharides and 15-20% by weight of hydrogenated polysaccharides having a degree of polymerization greater than hexasaccharides.

7. The soft candy composition of claim 1 wherein said at least one polymer is selected from water-soluble, randomly bonded condensation polymers of dextrose.

8. The soft candy composition of claim 1 which includes at least one edible acid selected from the group of citric acid, isocitric acid, maleic acid, fumaric acid, succinic acid, adipic acid, malic acid, and tartaric acid.

9. The soft candy composition of claim 8 wherein said at least one edible acid is citric acid.

10. The soft candy composition of claim 1 which includes at least one food additive selected from flavorings, colorings, and salt.

11. The soft candy composition of claim 3 having a caloric content of no more than 2.67 calories/gram.

12. The soft candy composition of claim 7 wherein said at least one polymer is polydextrose.

13. A soft candy composition consisting essentially of:
   (a) 35-45% by weight of a hydrogenated starch hydrolysate consisting essentially of 6-8% by weight of D-Sorbitol, 50-55% by weight of hydrogenated disaccharides, 20-25% by weight of hydrogenated tri to hexasaccharides and 15-20% by weight of hydrogenated polysaccharides having a degree of polymerization greater than hexasaccharide;
   (b) 40-30% by weight of polydextrose;
   (c) 5-16% by weight of gelatin; and
   (d) 6-20% by weight of water.

14. The soft candy composition of claim 13 which includes at least one edible acid selected from the group consisting of citric acid, isocitric acid, maleic acid, fumaric acid, succinic acid, adipic acid, malic acid, and tartaric acid.

15. The soft candy composition of claim 14 wherein said at least one edible acid is citric acid.

16. The soft candy composition of claim 13 which includes at least one food additive selected from flavorings, colorings, and salt.

17. The soft candy composition of claim 15 which includes at least one food additive selected from flavorings, colorings, and salt.

18. The soft candy composition of claim 13 having a caloric content of no more than 2.67 calories/gram.

* * * * *